Aug. 5, 1947.   W. A. BOHANNON   2,425,081
SYNCHRONIZATION TESTER
Filed Sept. 24, 1943
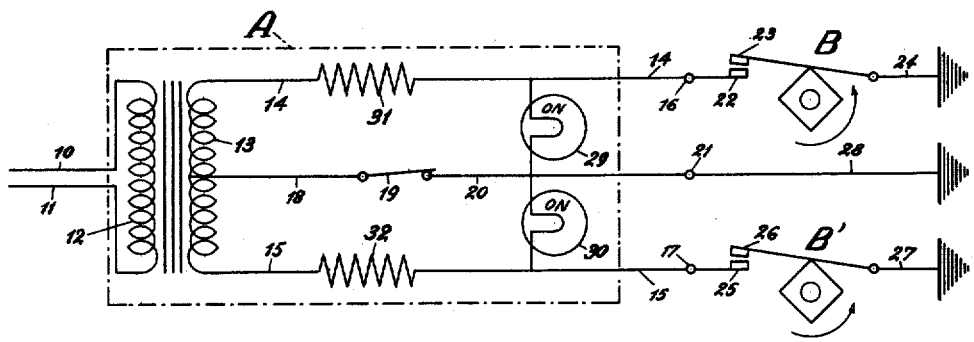
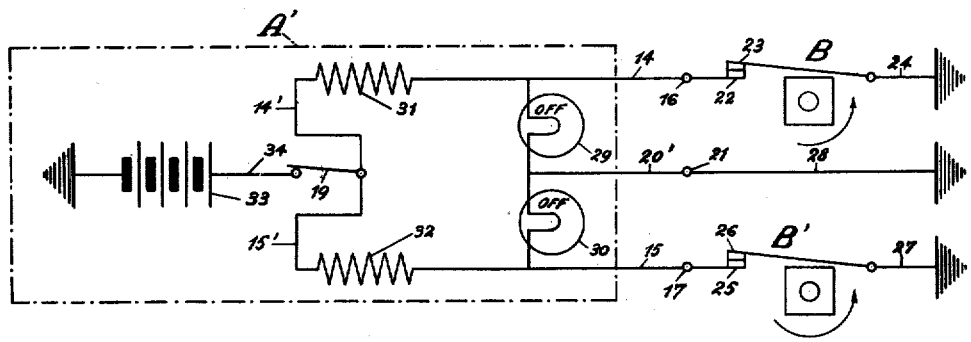
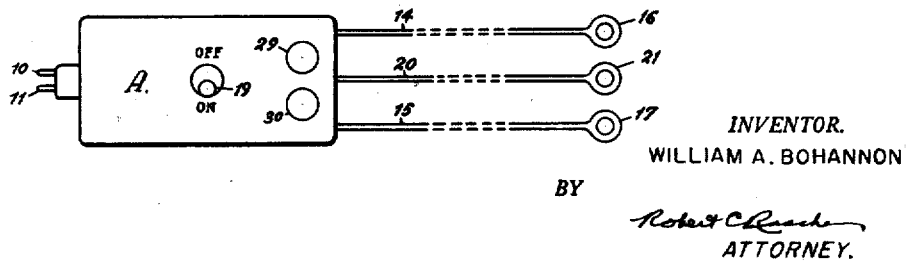
INVENTOR.
WILLIAM A. BOHANNON
BY
Robert C. Rusch
ATTORNEY.

Patented Aug. 5, 1947

2,425,081

UNITED STATES PATENT OFFICE 2,425,081

SYNCHRONIZATION TESTER

William A. Bohannon, Uniondale, N. Y., assignor to Republic Aviation Corporation, a corporation of Delaware Application September 24, 1943, Serial No. 503,603

1 Claim. (Cl. 177—311)

1

This invention relates to synchronization testers and contemplates a tester which will accurately indicate the synchronization or the non-synchronization of the contacts or breakers of the magnetos of dual ignition systems for internal combustion engines. While the present invention may be of general application and use, it is essentially designed for testing the synchronization of the dual ignition systems of the internal combustion engines used in aircraft, particularly high altitude aircraft.

This invention contemplates a tester having a visual indicator for each of the magnetos of a dual ignition system, whereby the operation of the several indicators may be concurrently and accurately observed to determine the degree of variance in, or the simultaneous operation of, the contacts or breakers of the several magnetos of the system.

With the above and other objects in view, as will be apparent, the invention consists in the construction, combination and arrangement of parts, all as hereinafter more fully described, claimed and illustrated in the accompanying drawings, wherein—

Fig. 1 is a diagrammatic view of the present invention showing the electrical circuits used with 110 volt current and a transformer;

Fig. 2 is a similar view illustrating the same used with a battery; and

Fig. 3 is an elevation of a tester involving one or the other of the circuits illustrated diagrammatically in Figs. 1 and 2.

In aircraft it is customary to employ dual ignition systems adjusted to operate in perfect synchronization, each system having a magneto connected with a spark plug in each of the engine's cylinders, the make and break of the magneto constituting the timer of the system and the distributor determining the order of the successive firing of the several cylinders. These dual systems, where each cylinder is provided with two spark plugs, must operate in perfect synchronization in order to get the maximum ignition spark at or near the approximate end of the compression stroke of the piston. If one spark plug or series of spark plugs lags in firing, there is an appreciable loss of power particularly at high altitudes where operating conditions at best are difficult, and not infrequently there is a complete failure of ignition in one or more cylinders where the two sparks instead of being simultaneously produced are created in a sequence. Thus an instrument which accurately and instantly indicates the lag, if any, in the closing and opening of the magneto contacts or breakers is of inestimable value in the adjustment of the ignition system prior to flight.

Heretofore instruments for the testing of the synchronization of dual ignition systems have employed testing lamp circuits fed by a battery or in series with the secondary winding of a transformer, each circuit also including the movable contacts or breakers of one of the magnetos. In this manner each magneto acts as a switch to light the lamp of its test circuit when the contacts or breakers of the magneto close and to extinguish said lamp when the contacts or breakers of the magneto open. Thus, in this prior instrument, when the magnetos are operating in perfect synchronization, the two lamps of the instrument light and extinguish simultaneously, but if one magneto is lagging the lamps of the test circuits extinguish in sequence or succession.

Since the charge of the engine is fired when the contacts or breakers of the magnetos open, precise testing is predicated upon the opening of the contacts or breakers and when this occurs the lamps of the prior type of tester extinguish. With these prior testing instruments, especially when operating in conjunction with engines requiring substantially perfect synchronization, it is particularly difficult to observe the several test lamps to ascertain the simultaneous or successive extinguishing thereof with any degree of certainty. In bright light such as daylight, it is extremely difficult, if not altogether impossible, to precisely ascertain either the simultaneous or the successive extinguishment of the lamps and frequently the observer has the illusion that both lamps are lighted when in fact one of them is extinguished.

The elimination of the difficulty of detecting the simultaneous or the successive extinguishment of the several test lamps, and the minimizing, if not total elimination, of any inaccuracy in the test normally attributable to the usual optical illusion in observing light is contemplated by this invention.

It has been found by experiment that the human eye will more accurately and precisely react to and record the lighting of a lamp than the extinguishment thereof and therefore the present invention proposes the lighting of test lamps when the contacts or breakers of the magnetos open and the extinguishment of the lamps when the contacts or breakers of the magnetos close.

The instant invention also contemplates the protection of the battery or transformer, as the case may be, from short circuiting or burning due to the making and breaking of the test circuits forming part hereof.

Reference being had more particularly to the drawings, A represents a casing or housing designed to include all of the circuits and elements combining to create the present tester. At one end of the casing or housing A are the leads 10 and 11 by which the instrument may be connected to the usual 110 volt power line or other source of electrical energy. These leads within the housing A are connected to the primary winding 12 of a standard transformer.

The secondary winding 13 of the transformer is electrically connected by the line 14, through the resistance 31 to the terminal 16 on the exterior of the housing. The opposite end of the secondary winding 13 of the transformer is connected by the line 15 through the resistance 32 to the terminal 17 also on the exterior of the housing. Centrally of its length the secondary winding 13 of the transformer is connected by the wire 18—20 through the switch 19 to a ground terminal 21 on the exterior of the housing.

A lamp 29 is connected in parallel with the line 14 on one side and the ground wire 18—20 on the other side. A similar lamp 30 is connected in parallel between the ground wire 18—20 and the line 15. As is apparent from Fig. 3, the lamps are visible from the exterior of the housing A and the switch 19 is operable from the exterior of the housing.

In practice the terminals 16 and 17 are respectively connected to the contacts 22 and 25 of the magnetos B and B', the movable contacts 23 and 26 of which are connected through the wires 24 and 27 to ground. The central or common terminal 21 is directly connected to ground by the wire 28. Hence it will be manifest that in that form of the invention disclosed in Figs. 1 and 3, the connecting of the terminals 16, 17 and 21 as above described and the closing of the switch 19 will set the device for the testing of the synchronization of operating of the two magnetos B and B'. The contacts 22 and 23 and 25 and 26 respectively of the magnetos B and B' are shown out of engagement in Fig. 1. When this condition exists and the switch 19 is closed, current from the secondary coil 13 of the transformer will flow through wires 14, 18, 20 and 15 and through lamps 29 and 30. The continued rotation of the magnetos B and B' closes the contacts 22—23 and 25—26 thereof, thereby directing the current flow from the secondary coil 13 of the transformer through the common ground wires 18—20, terminal 21 and wire 28 to ground and through the lines 14 and 15, the terminals 16 and 17, the closed contacts 22—23 and 25—26 aforesaid and through the wires 24 and 27 to ground. When this occurs the lamps 29 and 30 are shunted and are consequently extinguished.

When the contacts are opened, as illustrated in Fig. 1, the current, being unable to flow through the magneto contacts or breakers, is directed through the lamps 29 and 30, lighting them. Thus the lamps 29 and 30 become illuminated when the breakers or contacts of the magnetos are out of engagement and become extinguished when the breakers or contacts of the magnetos are in engagement.

When the contacts 22—23 are open and the contacts 25—26 are closed, the current induced in the secondary 13 flows simultaneously in the shorter circuit 14, 31, 29, 18 of the magneto B and in the longer circuit 15, 32, 17, 25—26, 27, ground, 28, 21, 20, 18 of the magneto B' leaving thus the lamp 30 shunted and consequently extinguished. Obviously it is lamp 29 which is shunted when inversely the contacts 22—23 are closed and the contacts 25—26 are open.

Fig. 2 illustrates the present invention as it is modified for operation from a battery 33. In this embodiment one side of the battery 33 is connected to ground and the other side by a lead 34 through the switch 19 to a pair of lines 14' and 15'. The line 14' connects through the resistance 31 to the line 14 leading from the housing A and ending in the terminal 16. The line 15' connects through the resistance 32 to the line 15 ending exteriorly of the housing in the terminal 17. The lamps 29 and 30 respectively are connected to the lines 14 and 15 and to the common ground wire 20' ending in the terminal 21 exteriorly of the housing to be connected by a wire 28 to ground.

In this modification of the invention the contacts 22—23 and 25—26 of the magnetos B and B' are illustrated as closed, as is also the switch 19, thereby directing current from the battery 33 through the line 14', resistance 31 and line 14, the terminal 16, and contacts 22—23 to ground, and also through the line 15', resistance 32, the line 15 through the terminal 17 and contacts 25—26 to ground. Under these conditions the lamps 29 and 30 are extinguished. When the contacts 22—23 and 25—26 of the magnetos B—B' are opened, the current flow will be from the battery 33 through the line 14', line 14, the lamp 29 and the common ground wire 20' and also through the line 15', the line 15, the lamp 30 to the common ground wire 20', whereupon the lamps will each become illuminated the instant electrical engagement is broken between the contacts or breakers of the magneto with which it is cooperating.

When only either the contacts 22—23 or 25—26 are opened, the corresponding battery circuit is directed through the corresponding lamp 29 or 30, while the other lamp remains shunted.

From the foregoing it will be evident that the present invention provides a test lamp for each magneto of a dual ignition system and that each of these lamps will become illuminated the instant the contacts or breakers of its cooperating magneto break electrical engagement and will be extinguished when said contacts or breakers again enter into electrical engagement. Thus the close and accurate observation of both lamps at the same time will be facilitated in that sequential or simultaneous illumination of the lamps 29 and 30 can be truly observed and the breakers or contacts of the timers or magnetos adjusted.

After the tester has been connected with the installed magnetos as above described the engine is rotated slowly by hand, until the lamps 29 and 30 become illuminated. If this illumination occurs simultaneously and at the proper point in the cycle of the engine, the magnetos are properly synchronized; but if the lamps become illuminated in sequence or at an improper point in the cycle of the engine it denotes that the magnetos are not operating in synchronization and/or that the firing is taking place at the incorrect point in the compression stroke. When adjustments have been made to correct any inaccuracies in timing the test is repeated until the lamps 29 and 30 become illuminated at exactly the same instant and at the proper predetermined point in the cycle of the engine.

The inventive concepts and several illustrative embodiments thereof having been thus disclosed in the manner required by the statutes, what is claimed as new is:

Apparatus for synchronizing the breaker points of magnetos, comprising a lamp associated with and individual to each magneto, a power source having a centertap and a switch in series with the centertap, a closed circuit for one lamp including part of the power source on one side of the centertap, the centertap and a current-limiting means in series with the lamp, a closed circuit for the other lamp including a part of the power source on the other side of the centertap, the centertap and a current-limiting means in series with said latter lamp, and parallel shunting connections for each lamp including the breaker points of the associated magneto.

WILLIAM A. BOHANNON.

REFERENCES CITED

The following references are of record in the file of this patent:

UNITED STATES PATENTS

| Number | Name | Date |
|---|---|---|
| 1,453,635 | Morris | May 1, 1923 |
| 2,241,731 | Mitchell | May 13, 1941 |

FOREIGN PATENTS

| Number | Country | Date |
|---|---|---|
| 729,738 | France | May 2, 1932 |